May 1, 1956     R. C. DU BOIS     2,743,735
CONTROL APPARATUS RESPONSIVE TO THE EXTREME MAGNITUDE
OF ONE OF A PLURALITY OF VARIABLES
Filed Oct. 8, 1954     2 Sheets-Sheet 1
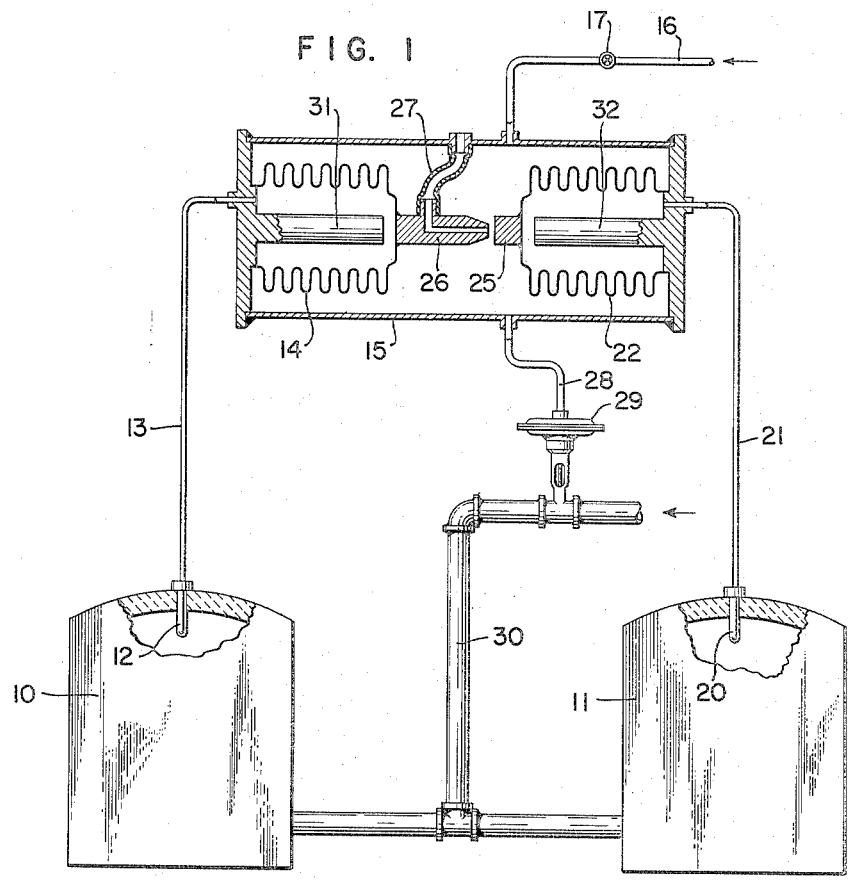
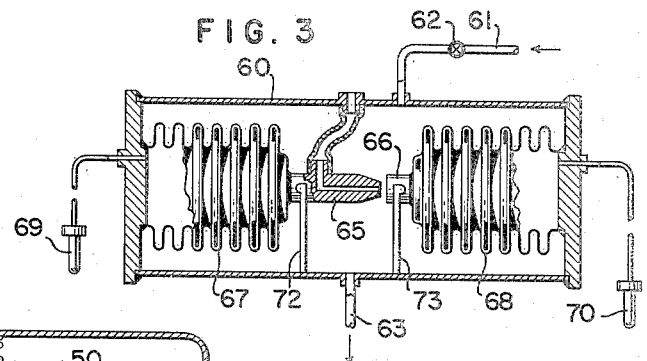
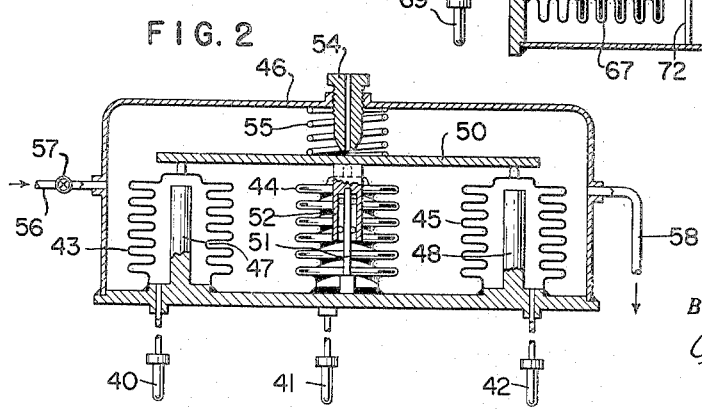
INVENTOR.
Robert C. Du Bois
BY
ATTORNEY.

United States Patent Office 2,743,735
Patented May 1, 1956

2,743,735

CONTROL APPARATUS RESPONSIVE TO THE EXTREME MAGNITUDE OF ONE OF A PLURALITY OF VARIABLES

Robert C. Du Bois, Fairfield, Conn., assignor to Minneapolis-Honeywell Regulator Company, Minneapolis, Minn., a corporation of Delaware Application October 8, 1954, Serial No. 461,103

10 Claims. (Cl. 137—85)

A general object of the present invention is to provide an improved apparatus for indicating the extreme magnitude of one of a plurality of variables. More specifically, the present invention is concerned with an improved apparatus for producing a fluid pressure which is indicative of the maximum magnitude or the minimum magnitude of one of a plurality of variables.

In many process controls it is desirable to monitor a number of points in a complete process and effect a controlling action when one of the variables under the observation of the monitor deviates from a predetermined value or exceeds one of the other variables. In addition, it is sometimes desired that the most extreme variation of one of the monitored variables be effective as a means to establish the monitor output pressure control signal. Thus, in the control of a plurality of heat treating ovens or baking ovens it may be desired that the temperatures of the ovens be monitored and controlled so that if one of the ovens becomes excessively cold or excessively hot that the control for all of the ovens be in accordance with the extreme deviation. In other instances, it may be desired that an operator of a plurality of processes know the maximum or minimum condition existing in the processes without necessarily knowing which of the units is representative of the maximum deviation or extreme condition.

The present invention accomplishes a pressure measurement by regulating the outflow of a fluid from an enclosed space. The regulating means includes a fluid flow throttling means controlled by the relative positioning of a throttling means with respect to an exhaust port for the chamber. The throttling means and/or the exhaust port may be relatively positioned with respect to each other in accordance with an external pressure condition acting upon a pressure deflectable unit and the rate of fluid flow from the chamber is controlled to establish a pressure within the chamber which balances the external pressure which is effecting the flow of the throttling action of the throttling means with respect to the exhaust port.

It is accordingly a more specific object of the present invention to provide an apparatus for establishing a pressure proportional to the extreme magnitude of one of a plurality of control pressures by utilizing a controlled throttling of the fluid flow from the chamber.

Another more specific object of the present invention is to provide a fluid pressure type apparatus for establishing a control pressure indicative of the maximum or minimum of one of a plurality of variables wherein the control pressure is used to balance that pressure which is used to establish the control pressure.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there has been illustrated and described a preferred embodiment of the invention.

Of the drawings:

Fig. 1 is a diagrammatic showing of one form of the apparatus employed for detecting the maximum input pressure signal;

Fig. 2 represents a modified form of the apparatus of Fig. 1 wherein more than two variables can be used with the maximum of the input variables being used to establish the control pressure;

Fig. 3 shows a modification to the apparatus of Fig. 1 wherein it is possible to achieve an output control pressure indicative of the minimum of a plurality of variables.

Figure 4:
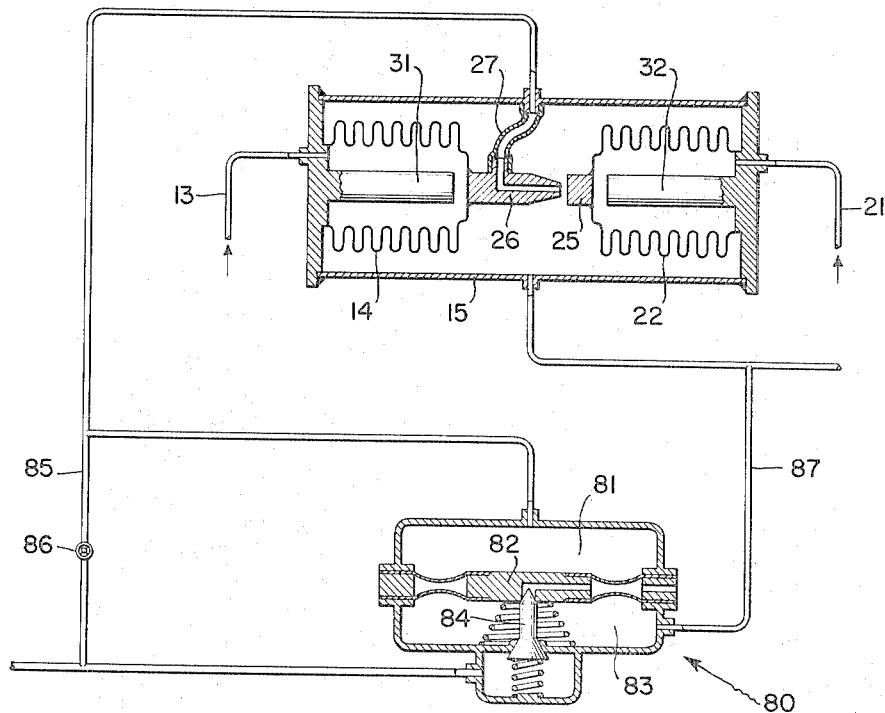
Fig. 4 shows the apparatus with a pilot relay included with the basic sensing element.

Referring first to Fig. 1, the numeral 10 represents a baking furnace or oven and the numeral 11 represents another similar furnace or oven. Sensing the temperature condition within the furnace 10 is a bulb 12 which is connected by way of a capillary tubing 13 to the inside of a bellows unit 14. The bellows unit 14 is placed inside of the chamber 15, said chamber having air supplied thereto by intake conduit 16 with a restriction 17 in series therewith.

Sensing the temperature within the furnace 11 is a further temperature sensing bulb 20 which is connected by way of a capillary tubing 21 to the inner surface of a bellows unit 22, the latter of which is also placed within the chamber 15. Carried by the end of the bellows unit 22 is a throttling member 25 which cooperates with the exhausting port member 26, the latter of which is carried by the floating end of the bellows 14. The exhaust port member 26 is connected by way of a flexible tubing 27 so as to exhaust to the atmosphere.

The pressure condition within the chamber 15 is transmitted by way of a conduit 28 to a suitable pneumatic control valve 29, the latter of which may be used to regulate the flow of a fuel flowing to the furnaces 10 and 11. As shown, the valve 29 is adapted to regulate the fuel flowing to both of the furnaces 10 and 11 since it is placed in a common supply conduit 30. Positioned within the bellows units 14 and 22 are a pair of mechanical stop members 31 and 32.

Considering the operation of Fig. 1, it should first be noted that when the ends of the bellows units 14 and 22 are adjacent their respective stops 31 and 32, there will be no throttling action taking place and the air flowing into the chamber 15 through the inlet conduit 16 will be passing through the exhaust port member 26 and flexible coupling 27 to atmosphere. This will means that there will be substantially atmospheric pressure within the chamber 15. If there is any temperature condition to be measured in the furnaces 10 and 11, the respective sensing bulbs 12 and 20 will produce an output pressure which will cause their respective bellows 14 and 22 to be expanded. As the bellows units 14 and 22 expand toward each other, the throttling member 25 on the end of the bellows 22 approaches the exhaust port 26 and the rate of air flow through the exhaust port will be controlled. In the absence of a supply pressure through the inlet conduit 16, the throttle 25 would move against the exhaust port member 26 and shut off the exhausting of air to atmosphere. However, since there is air supplied to the chamber 15 which is under pressure, the throttling action will take place only to the extent that it causes a pressure to build up in the chamber 15 which will balance the pressures of the bellows units 14 and 22. In other words, the pressure condition within the chamber 15 action on the external surface of the bellows units 14 and 22 will balance the applied pressure signal derived from the temperature sensing bulbs 12 and 20.

The pressure signal within the chamber 15 may then be used to regulate the operation of the control valve 29 which supplies the regulating action for the fuel flowing to the furnaces 10 and 11. As long as the temperature signals from the bulbs 12 and 20 are equal and the resultant pressures acting on the bellows units 14 and 22 are equal, the pressure condition in the chamber will tend to follow the temperature condition within the furnace and thus the pressure fed to the valve may be used to regulate the temperature of both of the furnaces.

The apparatus shown is arranged so that if one of the temperature of one of the furnaces begins to increase above that of the other, the increased signal will be in control of the final output pressure. Thus, if the temperature condition within the furnace 10 should decrease, the pressure in the bellows 14 will decrease and the bellows will be moved back against the stop 31. This will open the exhaust port 26 so that the pressure will initially drop within the chamber 15. The dropping of the pressure within the chamber 15 will permit the expansion of the bellows 22 so that the throttling member 25 will be moved to the left adjacent the exhaust port 26 until a balancing pressure has been built up in the chamber 15 which will balance the pressure condition within the bellows 22. Thus, the pressure condition within the chamber 15 will be that representing the maximum temperature condition as indicated by the pressure within the bellows 22 and this pressure will now be controlling the operating of the valve 29. It will be readily apparent that the valve 29 will be controlling the fuel to both of the furnaces 10 and 11 only in accordance with the maximum temperature condition at a particular value as indicated by the thermal bulb 20.

If the reverse condition should occur so that the bellows 22 collapses against its stop 32, the bellows unit 14 will expand and move toward the right so that the exhaust port 26 will move adjacent to throttling member 25 until the pressure condition within the chamber 15 balances the pressure applied to the inner surface of the bellows 14. In this instance, the pressure within the chamber 15 will be following the temperature condition as sensed by the bulb 12 and its pressure will then be in control of the final control valve 29.

Referring now to Fig. 2 there is here shown a modified form of the apparatus wherein more than two variables are fed into the sensing unit. In this figure there are shown three separate sensing units 40, 41, and 42 each of which may be of this same type as shown in Fig. 1, that is, temperature sensing units effective to produce pressures in the respective receiving bellows 43, 44 and 45 which are proportional to the temperature conditions sensed by the respective sensing bulbs. The bellows units 43, 44 and 45 are all positioned within the chamber space enclosed by the chamber 46 and these bellows each have the chamber pressure applied to the external surface thereof. Each of the bellows units is associated with a mechanical stop such as the stop 47 associated with the bellows 43 and the stop 48 associated with the bellows 45. A baffle or throttling plate 50 is mounted for vertical movement on a spindle 51. A suitable bearing element may insure substantially friction free movement of the throttling member or baffle plate 50 along the spindle 51. An exhausting port 54 is mounted in the wall of the chamber 46 and the passage therein exhausts to atmosphere. The baffle or throttling member 50 may be biased by a suitable spring 55.

A fluid under pressure is supplied to the chamber 46 by way of a conduit 56 which has a restriction 57 in series therewith. The output pressure from the chamber 46 may be passed through a suitable conduit 58 to some indicator or control apparatus, such as shown in Fig. 1.

In considering the operation of Fig. 2, it should be noted that any one of the bellows units 43, 44 or 45 may be effective when expanded to move against the throttling plate 50 and move it against the exhaust port member 54 so as to throttle the air flow exhausting to atmosphere. When any one of the units is moving the plate 50, it will move the plate against the exhaust port to throttle the air flowing from the chamber until such time as the pressure within the chamber balances the pressure of the particular bellows unit that is moving the throttling member 50. It will thus be readily apparent that the pressure condition within the chamber 46 will always follow the maximum pressure condition exhibited by any one of the bellows units supplying a force to the throttling plate 50. While three bellows units have been shown it will be readily apparent that a much larger number of bellows units may be employed without interfering with the principles of operation of the present apparatus.

The apparatus shown in Fig. 3 is arranged to select a minimum pressure condition applied to the bellows units shown therein. In this figure, the numeral 60 represents a chambered space having an inlet from a conduit 61 which passes through a restriction 62. The output control pressure from the chamber 60 passes through a conduit 63 to a suitable control or indicating device. The pressure condition within the chamber 60 is regulated by the relative positioning of the exhausting port member 65 relative to the throttling plate 66. The bellows units of the present apparatus include a pair of bellows 67 and 68. The bellows 67 receives its actuating pressure from a suitable thermal element 69 which supplies a vapor pressure to the internal surface of the bellows. A further temperature bulb 70 is used to supply the operating pressure for the bellows unit 68. A mechanical stop for the bellows 67 is provided at 72 and this serves to limit the movement at the right end of the bellows 67 as it is expanding. A further stop 73 is provided for the bellows 68 and this prevents or limits the expansion of the bellows 68. The stops 72 and 73 are positioned with respect to the respective bellows so that when both of the bellows units have expanded against the stops, the throttling member 66 will be adjacent the exhausting port member 65.

In considering the operation of Fig. 3, it is first assumed that the pressure conditions are such that the bellows units have an equal pressure on the inner surface thereof. The bellows units will tend to move against their stops 72 and 73. However, as the throttling member 66 moves adjacent the exhausting port member 65, the pressure condition within the chamber 60 will build up to balance the supply pressures to the bellows 67 and 68. This will mean that the pressure condition within the chamber 60 will balance the input pressures and this pressure will be available in the output conduit 63 for control and indicating purposes. If the pressure condition in the bellows 68 should decrease, a throttling member 66 will be moved toward the right and in so moving the pressure within the chamber 60 will drop due to the opening of the exhausting port member 65. As the pressure within the chamber 60 drops, the bellows 68 will tend to move back toward the left until a stable point is reached where the pressure condition within the chamber balances the pressure condition within the bellows 68.

If the pressure condition within the bellows 67 should drop, the exhausting port member 65 will be moved toward the left and this will likewise cause a drop in the pressure within the chamber 60. The drop within the chamber 60 will permit expansion of the bellows 67 until it moves back toward the right and a balancing pressure within the chamber 60 is built up. This balancing pressure may then be fed, as before, through the conduit 63 to a suitable indicating or control apparatus.

Fig. 4 shows a modification of the apparatus of Fig. 1 where a pilot relay 80 has been added. The pilot relay is incorporated to increase the amount of air available for actuating an output device, such as the valve 29 of Fig. 1. In Figs. 1 and 4, corresponding components carry corresponding reference characters.

The pilot relay 80 may be of any conventional type. As shown, it comprises an inlet chamber 81, a pressure deflectable member 82 having a bleed port therein, a balancing chamber 83 and a throttling means 84.

In Fig. 4, air is supplied to the sensing element and pilot relay by a conduit 85 having a restriction 86 therein. The pressure is supplied directly to the nozzle 26 by way of the flexible coupling 27. As the flapper or throttling unit 25 varies in its relation to the nozzle 26, there will be a back pressure reflected through the coupling 27 to the pilot relay chamber 81. The pilot relay will then establish an output pressure in conduit 87 to operate a control valve or the like and to supply a balancing or feedback pressure to the chamber 15. The feedback pressure will act upon the bellows unit which is at its extreme condition and the flapper 25 and nozzle 26 will assume a position of balance.

It will be readily apparent that a pilot relay may be interposed in series in conduit 28, in Fig. 1, to function in the normal manner.

It will be readily apparent that there has been provided in each of the forms of the invention shown an apparatus which will sense the extreme magnitude of one of a plurality of applied signals whether that extreme be considered the largest of the plurality or the smallest of the plurality. While the apparatus has been shown in conjunction with a temperature measuring and control apparatus, it will be readily apparent that any suitable source of fluid pressure for the bellows units or pressure deflected units of the apparatus could be used and the output pressure may be used in a variety of ways. It will also be readily apparent that the bellows units could be replaced by suitable diaphragm units.

While, in accordance with the provisions of the statutes, there has been illustrated and described the best forms of the embodiments of the invention known, it will be apparent to those skilled in the art that changes may be made in the form of the apparatus without departing from the spirit of the invention as set forth in the appended claims and that in some cases, certain features of the invention may be used to advantage without a corresponding use of other features.

Having now described the invention, what is claimed as new and for which it is desired to secure Letters Patent is:

1. Apparatus for producing an indication of the magnitude of one of a plurality of variables which represents an extreme condition comprising, an enclosed chamber having a fluid supplied thereto through a restricted passage, an escape port from said chamber, a throttling member for said port, and a plurality of fluid pressure deflectable units each of which is positioned within said chamber to variably adjust the relative position of said throttling member with respect to said port so that the pressure condition in said chamber balances the extreme of the fluid pressure acting on one of said deflectable units which is effective to control the escape of fluid from said chamber.

2. Pressure indicating apparatus comprising, a chambered space having a fluid pressure inlet with a restriction therein, a pair of pressure deflectable units, each of said units being positioned within said chamber to be exposed to the chamber pressure on one side and to a separate external pressure on the other, a bleed port for said chamber, a throttling member for said bleed port, means including one of said pressure deflectable units positioning said bleed port, means including the other of said pressure deflected units positioning said throttling member, said deflectable units regulating the fluid pressure in said chamber so that the chamber pressure will balance the extreme external pressure acting on the pressure deflectable units.

3. Apparatus of the type described comprising, a chambered space, means supplying a fluid under pressure through a restriction to said space, a first pressure deflectable unit positioned in said space and having a chamber exhausting port carried thereby, said unit having chamber pressure on one side thereof and a first external pressure on the outer side thereof, a second pressure deflectable unit positioned in said space and having an exhaust port throttling means carried thereby, said second unit having chamber pressure on one side thereof and a second external pressure on the other side thereof, both of said pressure deflectable units cooperating to regulate the pressure in said chamber by the regulation of the bleed rate from said chamber, said pressure balancing the extreme of said first or second external pressures acting on said pressure deflectable units.

4. Apparatus as described in claim 3 wherein a mechanical stopping means is positioned adjacent each of said pressure deflectable units on the chamber side of units so that said throttling means will close said exhaust port when both of said units are against said stopping means and the pressure in said chamber will balance the lowest of said external pressures.

5. Apparatus as defined in claim 3 wherein a mechanical stopping means is positioned adjacent each of said pressure deflectable units on the external pressure side thereof so that when said units are both adjacent said stops, the throttling means will not restrict the flow of fluid from said chamber and the pressure in said chamber will balance the highest of said external pressures.

6. Apparatus as defined in claim 3 wherein said exhaust port includes a flexible connection leading between the wall of said chambered space and the opening controlled by said throttling means.

7. Apparatus for detecting the maximum of a plurality of fluid pressures comprising a chambered space having a restricted fluid pressure inlet, an exhaust port for said chambered space, throttling means for regulating the fluid flow through said exhaust port, a plurality of pressure deflectable units positioned in said space, said units having one side thereof exposed to the chamber pressure and the other side of each exposed to a separate external pressure, means positioning said deflectable units adjacent said throttling means so that said throttling means will be moved only by that unit which is exposed to the highest external pressure condition, said chamber pressure when controlled by one of said units assuming a magnitude which will balance the external pressure acting on the unit controlling the throttling means.

8. A pneumatic controller comprising a plurality of bellows positioned within a chambered space, a nozzle defining a passage way into said space, a nozzle air flow throttling means, a restricted pneumatic supply line for said space, and means including said plurality of bellows positioned to adjust the relative position of said throttling means with said nozzle to regulate the pressure in said chambered space.

9. Apparatus as defined in claim 8 wherein said restricted pneumatic supply line to said space is by way of said nozzle.

10. A pneumatic controller comprising a plurality of bellows positioned within a chambered space, a nozzle defining a passage way into said space, a nozzle air flow throttling means, a restricted pneumatic supply line for said space, means including said bellows positioned to adjust said throttling means relative to said nozzle, a pneumatic pilot relay having a control chamber and an output chamber, means connecting said nozzle to said control chamber, and means connecting said output chamber to said chambered space to provide a feedback pressure for said space.

References Cited in the file of this patent

UNITED STATES PATENTS

| | | |
|---|---|---|
| 1,199,036 | Hodgkinson | Sept. 19, 1916 |
| 2,372,393 | Ray | Mar. 27, 1945 |
| 2,424,304 | Cunningham | July 22, 1947 |
| 2,441,044 | Tate | May 4, 1948 |
| 2,691,961 | Harris | Oct. 19, 1954 |